United States Patent
Takamatsu et al.

(10) Patent No.: US 10,522,806 B2
(45) Date of Patent: Dec. 31, 2019

(54) COMPOSITION FOR NON-AQUEOUS SECONDARY BATTERY FUNCTIONAL LAYER, FUNCTIONAL LAYER FOR NON-AQUEOUS SECONDARY BATTERY, AND NON-AQUEOUS SECONDARY BATTERY

(71) Applicant: ZEON CORPORATION, Chiyoda-ku, Tokyo (JP)

(72) Inventors: Hiromi Takamatsu, Tokyo (JP); Yuuki Ohkubo, Tokyo (JP); Yujiro Toyoda, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/755,681

(22) PCT Filed: Aug. 26, 2016

(86) PCT No.: PCT/JP2016/003893
§ 371 (c)(1),
(2) Date: Feb. 27, 2018

(87) PCT Pub. No.: WO2017/038067
PCT Pub. Date: Mar. 9, 2017

(65) Prior Publication Data
US 2018/0248162 A1   Aug. 30, 2018

(30) Foreign Application Priority Data
Aug. 31, 2015 (JP) ................................. 2015-171288

(51) Int. Cl.
| | | |
|---|---|---|
| *H01M 2/16* | (2006.01) | |
| *H01M 4/131* | (2010.01) | |
| *H01M 4/1391* | (2010.01) | |
| *H01M 4/13* | (2010.01) | |
| *H01M 4/139* | (2010.01) | |
| *H01M 10/052* | (2010.01) | |
| *H01M 10/0525* | (2010.01) | |
| *H01M 4/505* | (2010.01) | |
| *H01M 4/525* | (2010.01) | |

(52) U.S. Cl.
CPC ............... *H01M 2/16* (2013.01); *H01M 4/13* (2013.01); *H01M 4/131* (2013.01); *H01M 4/139* (2013.01); *H01M 4/1391* (2013.01); *H01M 10/052* (2013.01); *H01M 10/0525* (2013.01); *H01M 4/505* (2013.01); *H01M 4/525* (2013.01)

(58) Field of Classification Search
None
See application file for complete search history.

(56) References Cited

U.S. PATENT DOCUMENTS

| | | | | |
|---|---|---|---|---|
| 2007/0122716 | A1* | 5/2007 | Seo | H01M 2/1646 429/251 |
| 2009/0239147 | A1 | 9/2009 | Itou et al. | |
| 2013/0216891 | A1* | 8/2013 | Byun | H01M 2/16 429/144 |
| 2016/0293957 | A1* | 10/2016 | Okae | H01M 4/13 |

FOREIGN PATENT DOCUMENTS

| | | |
|---|---|---|
| EP | 2631974 A1 | 8/2013 |
| JP | H0948610 A | 2/1997 |
| JP | 2006306971 A | 11/2006 |
| JP | 2011210413 A | 10/2011 |
| JP | 2013145763 A | 7/2013 |
| WO | 2015079624 A1 | 6/2015 |
| WO | WO-2015079624 A1 * | 6/2015 ............. H01M 4/13 |

OTHER PUBLICATIONS

Dec. 19, 2018, the Extended European Search Report issued by the European Patent Office in the corresponding European Patent Application No. 16841102.3.
Oct. 4, 2016, International Search Report issued in the International Patent Application No. PCT/JP2016/003893.
Mar. 6, 2018, International Preliminary Report on Patentability issued in the International Patent Application No. PCT/JP2016/003893.

* cited by examiner

Primary Examiner — Maria Laios
(74) Attorney, Agent, or Firm — Kenja IP Law PC

(57) ABSTRACT

A composition for a non-aqueous secondary battery functional layer contains a binder and inorganic particles including a sulfonate group. A non-aqueous secondary battery includes a functional layer for a non-aqueous secondary battery that is formed using this composition for a non-aqueous secondary battery functional layer.

7 Claims, No Drawings

COMPOSITION FOR NON-AQUEOUS SECONDARY BATTERY FUNCTIONAL LAYER, FUNCTIONAL LAYER FOR NON-AQUEOUS SECONDARY BATTERY, AND NON-AQUEOUS SECONDARY BATTERY

TECHNICAL FIELD

This disclosure relates to a composition for a non-aqueous secondary battery functional layer, a functional layer for a non-aqueous secondary battery, and a non-aqueous secondary battery.

BACKGROUND

Non-aqueous secondary batteries (hereinafter, also referred to simply as "secondary batteries"), such as lithium ion secondary batteries, have characteristics such as compact size, light weight, high energy density, and the ability to be repeatedly charged and discharged, and are used in a wide variety of applications. A non-aqueous secondary battery generally includes battery components such as a positive electrode, a negative electrode, and a separator that isolates the positive electrode and the negative electrode from one another and prevents short circuiting between the positive and negative electrodes.

There are cases in which a battery component including a functional layer for imparting desired performance on the battery component is used in a secondary battery. Specifically, a separator obtained by forming a functional layer on a separator substrate or an electrode obtained by forming a functional layer on an electrode substrate including an electrode mixed material layer on a current collector may, for example, be used as a battery component.

In recent years, there has been much activity focused on enhancing functional layers with the aim of further raising secondary battery performance. In one specific example, an electrode has been proposed that is obtained by forming a functional layer having the ability to capture water or hydrogen fluoride (HF) on an electrode substrate (for example, refer to PTL 1). A functional layer described in PTL 1 contains inorganic particles having a prescribed BET specific surface area and improves rate characteristics and cycle characteristics of a secondary battery as a result of these inorganic particles trapping moisture and hydrogen fluoride in the secondary battery.

CITATION LIST

Patent Literature

PTL 1: JP 2011-210413 A

SUMMARY

Technical Problem

However, there has been demand for even higher secondary battery performance in recent years and there is room for improvement of electrical characteristics (for example, high-temperature cycle characteristics and low-temperature output characteristics) of a secondary battery that includes the functional layer described in PTL 1.

Accordingly, one objective of this disclosure is to provide a composition for a non-aqueous secondary battery functional layer that can improve secondary battery electrical characteristics. Another objective of this disclosure is to provide a functional layer for a non-aqueous secondary battery that can improve secondary battery electrical characteristics. Yet another objective of this disclosure is to provide a non-aqueous secondary battery having good electrical characteristics in which this functional layer for a non-aqueous secondary battery is used.

Solution to Problem

The inventors conducted diligent investigation with the aim of solving the problems set forth above. As a result, the inventors discovered that one cause of deterioration of secondary battery electrical characteristics is metal ions that unavoidably arise in a secondary battery and do not contribute to the battery reactions (hereinafter, also referred to simply as "metal ions"), and also discovered that these metal ions can be captured, and deterioration of electrical characteristics can be prevented through sulfonate group introduction into a functional layer. The inventors completed the present disclosure based on these discoveries.

Specifically, this disclosure aims to advantageously solve the problems set forth above by disclosing a composition for a non-aqueous secondary battery functional layer comprising: a binder; and inorganic particles including a sulfonate group. By using a functional layer formed using the composition for a secondary battery functional layer set forth above, secondary battery electrical characteristics such as low-temperature output characteristics and high-temperature cycle characteristics can be improved.

In this disclosure, the presence of sulfonate groups or other acid groups in inorganic particles and the ratio of sulfonate groups relative to all acid groups in the inorganic particles can be determined and calculated from a profile obtained by X-ray photoelectron spectroscopy (XPS analysis).

In the presently disclosed composition for a non-aqueous secondary battery functional layer, the inorganic particles preferably have a sulfonate group content of at least 0.1 μmol/g and not more than 1,200 μmol/g. As a result of the sulfonate group content being within a specific range, a balance of even higher levels of low-temperature output characteristics and high-temperature cycle characteristics can be achieved in a non-aqueous secondary battery in which a functional layer for a non-aqueous secondary battery is used.

In this disclosure, the sulfonate group content of inorganic particles can be calculated, for example, by measuring the amount of all acid groups included in the inorganic particles by neutralization titration and then multiplying the obtained value by the ratio of sulfonate groups relative to all acid groups in the inorganic particles as calculated from a profile obtained by XPS analysis.

For example, the amount of all acid groups included in inorganic particles can be determined by converting sulfonate group counter-ions to hydrogen ions through treatment of the inorganic particles with 1 N hydrochloric acid aqueous solution, and subsequently performing treatment with 0.5 N sodium chloride aqueous solution and neutralization titration of free hydrogen ions.

In the presently disclosed composition for a non-aqueous secondary battery functional layer, the inorganic particles preferably have a percentage content of 80 mass % or more relative to total solid content. As a result of the percentage content of the inorganic particles being 80 mass % or more relative to total solid content, low-temperature output characteristics of a secondary battery including a functional layer formed using the composition for a secondary battery functional layer can be further improved.

In the presently disclosed composition for a non-aqueous secondary battery functional layer, the binder preferably includes a sulfonate group. When the binder includes a sulfonate group, a balance of even higher levels of low-temperature output characteristics and high-temperature cycle characteristics can be achieved in a secondary battery including a functional layer formed using the composition for a secondary battery functional layer.

Moreover, this disclosure aims to advantageously solve the problems set forth above by disclosing a functional layer for a non-aqueous secondary battery formed using any one of the compositions for a non-aqueous secondary battery functional layer set forth above. By using the presently disclosed composition for a non-aqueous secondary battery functional layer in this manner, it is possible to form a functional layer for a non-aqueous secondary battery that can cause a secondary battery to display excellent low-temperature output characteristics and high-temperature cycle characteristics.

Furthermore, this disclosure aims to advantageously solve the problems set forth above by disclosing a non-aqueous secondary battery comprising the functional layer for a non-aqueous secondary battery set forth above. By using the presently disclosed functional layer for a non-aqueous secondary battery in this manner, a non-aqueous secondary battery having excellent electrical characteristics, such as low-temperature output characteristics and high-temperature cycle characteristics, can be obtained.

It is preferable that the presently disclosed non-aqueous secondary battery comprises a positive electrode, a negative electrode, an electrolysis solution, and a separator, wherein the separator includes the functional layer for a non-aqueous secondary battery set forth above. By providing a separator with the presently disclosed functional layer, electrical characteristics of a secondary battery including the separator can be further improved.

In the presently disclosed non-aqueous secondary battery, the positive electrode preferably contains a positive electrode active material including one or more of Co, Mn, Fe, and Ni. In a secondary battery including the functional layer set forth above, reduction of secondary battery electrical characteristics caused by elution of Co, Mn, Fe, Ni, or the like can be sufficiently inhibited even in a case in which a positive electrode active material including any of Co, Mn, Fe, and Ni is used.

Advantageous Effect

According to this disclosure, it is possible to provide a composition for a non-aqueous secondary battery functional layer that can improve secondary battery electrical characteristics. Moreover, according to this disclosure, it is possible to provide a functional layer for a non-aqueous secondary battery that can improve secondary battery electrical characteristics. Furthermore, according to this disclosure, it is possible to provide a non-aqueous secondary battery having excellent electrical characteristics.

DETAILED DESCRIPTION

The following provides a detailed description of embodiments of the present disclosure.

The presently disclosed composition for a non-aqueous secondary battery functional layer is used as a material in production of the presently disclosed functional layer for a non-aqueous secondary battery. Moreover, the presently disclosed functional layer for a non-aqueous secondary battery is formed using the presently disclosed composition for a non-aqueous secondary battery functional layer. Furthermore, the presently disclosed non-aqueous secondary battery includes at least the presently disclosed functional layer for a non-aqueous secondary battery.

(Composition for Non-Aqueous Secondary Battery Functional Layer)

The presently disclosed composition for a non-aqueous secondary battery functional layer is a slurry composition in which water or the like serves as a dispersion medium, and that contains inorganic particles and a binder, and may optionally further contain additives and the like. A feature of the presently disclosed composition for a non-aqueous secondary battery functional layer is that the inorganic particles include a sulfonate group.

As a result of the inorganic particles that are contained in the presently disclosed composition for a non-aqueous secondary battery functional layer including a sulfonate group, a functional layer that is formed using the composition for a functional layer can improve secondary battery electrical characteristics such as low-temperature output characteristics and high-temperature cycle characteristics.

Although it is not clear why secondary battery electrical characteristics are improved through use of the composition for a non-aqueous secondary battery functional layer containing these inorganic particles, the reason is presumed to be as follows. In a secondary battery, and particularly in a secondary battery in which a transition metal-containing positive electrode active material is used, metal such as transition metal from the positive electrode active material normally elutes due to generation of hydrogen fluoride (hereinafter, also referred to as "hydrofluoric acid") in the secondary battery, resulting in the formation of metal ions, such as transition metal ions, that do not contribute to the battery reactions. The metal ions that are formed may migrate to the negative electrode in electrolysis solution and, upon reaching the negative electrode, may be reduced and deposit on the negative electrode. Moreover, these metal ions may react with an electrolysis solution that contains a carbonate such as ethylene carbonate to generate gases such as carbon monoxide and carbon dioxide. This causes deterioration of secondary battery electrical characteristics. However, the inorganic particles contained in the presently disclosed composition for a non-aqueous secondary battery functional layer can capture metal ions, such as transition metal ions, in a secondary battery as a result of including a sulfonate group. Accordingly, the presently disclosed composition for a non-aqueous secondary battery functional layer can improve secondary battery electrical characteristics because metal ions that are formed at the positive electrode can be captured before they reach the negative electrode, and gas generation in the secondary battery can be inhibited.

<Inorganic Particles>

The inorganic particles that are contained in the presently disclosed composition for a non-aqueous secondary battery functional layer include a sulfonate group. Through inclusion of sulfonate group-containing inorganic particles, a functional layer formed using the presently disclosed composition for a functional layer can improve secondary battery electrical characteristics such as low-temperature output characteristics and high-temperature cycle characteristics.

—Type of Inorganic Particles—

The sulfonate group-containing inorganic particles are not specifically limited and may, for example, be inorganic particles that are obtained through sulfonate group introduction with respect to inorganic particles used as a raw material (hereinafter, also referred to a "raw material inorganic particles"). The raw material inorganic particles are preferably particles of an inorganic compound that displays heat resistance, more preferably particles of an inorganic compound that does not exhibit thermal deformation at 150° C., and even more preferably particles of an inorganic compound that does not exhibit thermal deformation at 250° C. Examples of the raw material inorganic particles include, but are not specifically limited to, aluminum oxide (alumina) particles, barium sulfate particles, barium titanate ($BaTiO_3$) particles, titanium oxide (titania) particles, and zirconia particles. Of these examples, aluminum oxide particles and barium sulfate particles are preferable as the raw material inorganic particles. These inorganic particles may be subjected to element substitution, solid solution treatment, and/or the like as necessary.

—Method of Determining Sulfonate Group Presence—

The presence of sulfonate groups in the inorganic particles can be determined by X-ray photoelectron spectroscopy (XPS analysis), but is not specifically limited to being determined by this method. Specifically, the presence of sulfonate groups in the inorganic particles can be confirmed by measuring energy of photoelectrons generated upon irradiation of the inorganic particles using X-rays with a power of 25 W and a beam diameter of 100 μm to obtain a profile of binding energy on a horizontal axis and number of photoelectrons on a vertical axis, and then detecting a peak in a binding energy region of 160 eV to 170 eV corresponding to the binding energy of a sulfonate group.

Note that the presence of acid groups other than sulfonate groups in the inorganic particles and the ratio of sulfonate groups relative to all acid groups in the inorganic particles can also be calculated from a profile obtained by XPS analysis. In a case in which the inorganic particles do not substantially include acids groups other than sulfonate groups, the aforementioned ratio is of course "1".

—Sulfonate Group Content—

The sulfonate group content in the inorganic particles is preferably 0.1 μmol/g or more, more preferably 1 μmol/g or more, and even more preferably 5 μmol/g or more, and is preferably 1,200 μmol/g or less, more preferably 1,000 μmol/g or less, even more preferably 500 μmol/g or less, further preferably 200 μmol/g or less, and particularly preferably 100 μmol/g or less. Through a sulfonate group content that is at least any of the lower limits set forth above, an increase in the Gurley value of a functional layer formed using the presently disclosed composition for a functional layer can be inhibited and secondary battery internal resistance can be reduced, which enables improvement of low-temperature output characteristics of a secondary battery that includes the functional layer. It is presumed that setting the sulfonate group content as at least any of the lower limits set forth above results in the formation of a functional layer in which an appropriate degree of spacing is maintained between the inorganic particles because the sulfonate groups repel one another during a process of applying the composition for a functional layer onto a substrate and drying the applied composition. Therefore, it is possible to avoid a situation in which packing of the inorganic particles is excessively dense and the Gurley value of the functional layer is excessively increased. Moreover, by setting the sulfonate group content as at least any of the lower limits set forth above, the amount of metal ions that is captured in the functional layer can be sufficiently increased, and secondary battery high-temperature cycle characteristics can be improved. Furthermore, by setting the sulfonate group content as not more than any of the upper limits set forth above, water importation by a functional layer formed using the presently disclosed composition for a functional layer can be reduced, and high-temperature cycle characteristics of a secondary battery that includes the functional layer can be further improved.

—Method of Sulfonate Group Modification of Inorganic Particles—

Sulfonate groups can be introduced into the raw material inorganic particles in accordance with known methods (for example, those described in JP H9-48610 A and JP 2006-306971 A) without any specific limitations. For example, inorganic particles and an epoxy silane compound-based silane coupling agent such as 3-glycidoxypropylmethyldimethoxysilane, 3-glycidoxypropyltrimethoxysilane, 3-glycidoxypropylmethyldiethoxysilane, or 3-glycidoxypropyltriethoxysilane may be mixed and heated, and then unreacted silane compound may be removed and the resultant inorganic particles may be brought into contact with a sulfite to perform sulfonate group modification of the inorganic particles. The amount of sulfonate group introduction can be adjusted by altering the amount of the silane coupling agent and the treatment time.

—BET Specific Surface Area—

The BET specific surface area of the inorganic particles is preferably 2 $m^2/g$ or more, more preferably 3 $m^2/g$ or more, and even more preferably 4 $m^2/g$ or more, and is preferably 10 $m^2/g$ or less, more preferably 9 $m^2/g$ or less, and even more preferably 8 $m^2/g$ or less. Through an inorganic particle specific surface area that is at least any of the lower limits set forth above, an increase in thickness and an increase in the Gurley value of a functional layer formed using the presently disclosed composition for a functional layer can be inhibited, and secondary battery internal resistance can be reduced, which enables improvement of low-temperature output characteristics of a secondary battery that includes the functional layer. Furthermore, by setting the inorganic particle specific surface area as not more than any of the upper limits set forth above, water importation by a functional layer formed using the presently disclosed composition for a functional layer can be reduced, and high-temperature cycle characteristics of a secondary battery that includes the functional layer can be further improved.

Herein, the term "BET specific surface area" refers to a nitrogen adsorption specific surface area that is measured by the BET method.

—Volume Average Particle Diameter (D50)—

The volume average particle diameter (D50) of the inorganic particles (particle diameter value at an integrated value of 50% in a volume basis particle size distribution) is preferably 0.2 μm or more, more preferably 0.3 μm or more, and even more preferably 0.4 μm or more, and is preferably 2.0 μm or less, more preferably 1.5 μm or less, and even more preferably 1.0 μm or less. By setting the volume average particle diameter of the inorganic particles as at least any of the lower limits set forth above, water importation by a functional layer formed using the presently disclosed composition for a functional layer can be reduced, and high-temperature cycle characteristics of a secondary battery that includes the functional layer can be further improved. Moreover, by setting the volume average particle diameter of the inorganic particles as not more than any of the upper limits set forth above, an increase in thickness of a functional layer formed using the presently disclosed composition for a functional layer can be inhibited, and a rise in secondary battery internal resistance can be inhibited, which enables improvement of low-temperature output characteristics of a secondary battery that includes the functional layer.

Herein, the volume average particle diameter of the inorganic particles can be measured, for example, using a laser diffraction particle size distribution analyzer. Examples of laser diffraction particle size distribution analyzers that can be used include the model "SALD-7100" produced by Shimadzu Corporation.

—Amount—

The amount of the inorganic particles that is contained in the presently disclosed composition for a non-aqueous secondary battery functional layer relative to total solid content is preferably 80 mass % or more, more preferably 85 mass % or more, and even more preferably 90 mass % or more, and is preferably 99 mass % or less. By setting the content of the inorganic particles among total solid content in the composition for a functional layer as at least any of the lower limits set forth above, an excessive increase in internal resistance of a secondary battery formed using the composition for a functional layer can be avoided, and low-temperature output characteristics of a secondary battery including a functional layer can be further improved. Moreover, by setting the content of the inorganic particles among total solid content in the composition for a functional layer as at least any of the lower limits set forth above, the captured amount of metal ions that do not contribute to battery reactions can be sufficiently increased, and secondary battery electrical characteristics can be further improved. Furthermore, by setting the content of the inorganic particles as not more than any of the upper limits set forth above, adhesiveness to a substrate of a functional layer formed using the composition for a functional layer can be ensured, and high-temperature cycle characteristics of a secondary battery that includes the functional layer can be further improved.

<Binder>

The presently disclosed composition for a non-aqueous secondary battery functional layer may contain a known binder without any specific limitations. Specifically, the binder is preferably a conjugated diene polymer or an acrylic polymer, and is more preferably an acrylic polymer. One of these polymers may be used individually, or two or more of these polymers may be used in combination.

It is preferable that the binder includes a sulfonate group. In other words, in a situation in which the binder is composed of a polymer such as a conjugated diene polymer or an acrylic polymer, it is preferable that the polymer includes a sulfonate group-containing monomer unit. When the binder also includes a sulfonate group in addition to the inorganic particles including a sulfonate group, the binder can act in conjunction with the above-described inorganic particles to capture metal ions, such as transition metal ions, in a secondary battery, and gas generation inside the secondary battery can be further inhibited. Therefore, secondary battery electrical characteristics (particularly low-temperature output characteristics) can be further improved compared to a case in which only the inorganic particles capture metal ions.

Examples of sulfonate group-containing monomers that can be used to form the sulfonate group-containing monomer unit include vinyl sulfonic acid, methyl vinyl sulfonic acid, (meth)allyl sulfonic acid, (meth)acrylic acid-2-ethyl sulfonate, 2-acrylamido-2-methylpropane sulfonic acid (AMPS), and 3-allyloxy-2-hydroxypropane sulfonic acid.

Of these sulfonate group-containing monomers, 2-acrylamido-2-methylpropane sulfonic acid is preferable.

The conjugated diene polymer that can be preferably used as the binder is a polymer that includes a conjugated diene monomer unit. Specific examples of the conjugated diene polymer include, but are not specifically limited to, copolymers including an aromatic vinyl monomer unit and an aliphatic conjugated diene monomer unit such as styrene-butadiene copolymer (SBR), butadiene rubber (BR), acrylic rubber (NBR) (copolymer including an acrylonitrile unit and a butadiene unit), and hydrogenated products thereof.

The acrylic polymer that can be preferably used as the binder is a polymer that includes a (meth)acrylic acid ester monomer unit. Examples of (meth)acrylic acid ester monomers that can be used to form the (meth)acrylic acid ester monomer unit include (meth)acrylic acid alkyl esters such as methyl acrylate, ethyl acrylate, butyl acrylate, methyl methacrylate, ethyl methacrylate, and 2-ethylhexyl acrylate (2-EHA). In the present disclosure, "(meth)acryl" is used to indicate "acryl" and/or "methacryl".

As previously explained, the acrylic polymer preferably includes a sulfonate group-containing monomer unit in addition to the (meth)acrylic acid ester monomer unit.

The acrylic polymer may optionally further include a (meth)acrylonitrile monomer unit, an acid group-containing monomer unit other than a sulfonate group-containing monomer unit, and a crosslinkable monomer unit. In the present disclosure, "(meth)acrylonitrile" is used to indicate "acrylonitrile (AN)" and/or "methacrylonitrile". Examples of monomers that can be used to form the acid group-containing monomer unit other than a sulfonate group-containing monomer unit include carboxylic acid group-containing monomers and phosphate group-containing monomers.

Examples of the carboxylic acid group-containing monomers include monocarboxylic acids and dicarboxylic acids. Examples of monocarboxylic acids include acrylic acid, methacrylic acid, and crotonic acid. Examples of dicarboxylic acids include maleic acid, fumaric acid, and itaconic acid.

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

In the present disclosure, "(meth)allyl" is used to indicate "allyl" and/or "methallyl", and "(meth)acryloyl" is used to indicate "acryloyl" and/or "methacryloyl".

One of these monomers that can form an acid group-containing monomer unit other than a sulfonate group-containing monomer unit may be used individually, or two or more of these monomers may be used in combination in a freely selected ratio.

Examples of monomers that can be used to form the crosslinkable monomer unit include multi-functional monomers having two or more polymerizable groups in the monomer. Examples of such multi-functional monomers include divinyl compounds such as divinylbenzene; di(meth)acrylic acid ester compounds such as ethylene dimethacrylate, diethylene glycol dimethacrylate, ethylene glycol dimethacrylate, diethylene glycol diacrylate, 1,3-butylene glycol diacrylate, and allyl methacrylate; tri(meth)acrylic acid ester compounds such as trimethylolpropane trimethacrylate and trimethylolpropane triacrylate; and epoxy group-containing, ethylenically unsaturated monomers such as allyl glycidyl ether and glycidyl methacrylate.

Examples of methods by which the polymers set forth above can be produced include solution polymerization, suspension polymerization, and emulsion polymerization.

—Percentage Content of Sulfonate Group-Containing Monomer Unit—

The content of the sulfonate group-containing monomer unit in the polymer used as the binder is preferably 0.1 mass % or more, and more preferably 0.2 mass % or more, and is preferably 10 mass % or less, and more preferably 5 mass % or less. When the percentage content of the sulfonate group-containing monomer unit in the polymer used as the binder is at least any of the lower limits set forth above, an increase in the Gurley value of a functional layer formed using the presently disclosed composition for a functional layer can be inhibited and secondary battery internal resistance can be reduced, which enables improvement of low-temperature output characteristics of a secondary battery that includes the functional layer. This is because the functional layer can be formed with appropriate spacing between the binder and the inorganic particles due to repulsion between sulfonate groups when the percentage content of the sulfonate group-containing monomer unit in the acrylic polymer is at least any of the lower limits set forth above. Furthermore, when the percentage content of the sulfonate group-containing monomer unit is not more than any of the upper limits set forth above, water importation by a functional layer formed using the presently disclosed composition for a functional layer can be reduced, and high-temperature cycle characteristics of a secondary battery that includes the functional layer can be further improved.

The percentage content of other monomer units in the polymer can be set freely. Note that in the present disclosure, the percentage content of each monomer unit in a polymer is the same as the proportion of each monomer used in production of the polymer.

—Amount of Binder—

The amount of the binder that is contained in the presently disclosed composition for a non-aqueous secondary battery functional layer among total solid content is preferably 1 mass % or more, more preferably 1.5 mass % or more, and even more preferably 2 mass % or more, and is preferably 20 mass % or less, more preferably 15 mass % or less, and even more preferably 5 mass % or less. By setting the content of the binder as at least any of the lower limits set forth above, adhesiveness to a substrate of a functional layer formed using the presently disclosed composition for a functional layer can be sufficiently increased, and high-temperature cycle characteristics of a secondary battery that includes the functional layer can be further improved. Moreover, by setting the content of the binder as not more than any of the upper limits set forth above, an increase in the Gurley value of a functional layer formed using the presently disclosed composition for a functional layer can be inhibited and secondary battery internal resistance can be reduced, which enables improvement of low-temperature output characteristics of a secondary battery that includes the functional layer.

<Dispersion Medium>

Water is normally used as a dispersion medium in the presently disclosed composition for a non-aqueous secondary battery functional layer. However, a mixture of water and another solvent may alternatively be used as the dispersion medium. Examples of other solvents that can be used include, but are not specifically limited to, alicyclic hydrocarbon compounds such as cyclopentane and cyclohexane; aromatic hydrocarbon compounds such as toluene and xylene; ketone compounds such as acetone, ethyl methyl ketone, and cyclohexanone; ester compounds such as ethyl acetate, butyl acetate, γ-butyrolactone, and ε-caprolactone; nitrile compounds such as acetonitrile and propionitrile; ether compounds such as tetrahydrofuran and ethylene glycol diethyl ether; alcohol compounds such as methanol, ethanol, isopropanol, ethylene glycol, and ethylene glycol monomethyl ether; and amide compounds such as N-methylpyrrolidone (NMP) and N,N-dimethylformamide. One of these other solvents may be used individually, or two or more of these other solvents may be used in combination in a freely selected ratio.

<Additives>

The composition for a non-aqueous secondary battery functional layer may optionally further contain other components besides the components described above. These other components may be any commonly known components without any specific limitations so long as they do not influence the battery reactions. One of such other components may be used individually, or two or more of such other components may be used in combination.

Examples of other components that can be used include known additives such as dispersants, viscosity modifiers, and wetting agents.

(Production Method of Composition for Non-Aqueous Secondary Battery Functional Layer)

The presently disclosed composition for a non-aqueous secondary battery functional layer set forth above can be obtained by mixing the above-described sulfonate group-containing inorganic particles, binder, and optional additives in the presence of a dispersion medium such as water, but is not specifically limited to being obtained in this manner.

Although no specific limitations are placed on the mixing method of these components, the mixing is preferably performed using a disperser as a mixing device in order to efficiently disperse the components. The disperser is preferably a device that can homogeneously disperse and mix the components. Examples of dispersers that can be used include a media-less disperser, a ball mill, a sand mill, a pigment disperser, a grinding machine, an ultrasonic disperser, a homogenizer, and a planetary mixer.

No specific limitations are placed on the mixing order of the above-described components. For example, the above-described components may be mixed in a single step, or the inorganic particles may be dispersed in the dispersion medium prior to the binder being added and dispersed.

In dispersion treatment of a mixed liquid containing the inorganic particles and the binder, it is preferable that the mixed liquid has a solid content concentration of at least 30 mass % and not more than 60 mass % because this can improve dispersibility of the inorganic particles in the resultant composition for a non-aqueous secondary battery functional layer.

(Functional Layer for Non-Aqueous Secondary Battery)

The presently disclosed functional layer for a non-aqueous secondary battery is a layer that is formed from the composition for a non-aqueous secondary battery functional layer set forth above. The presently disclosed functional layer for a non-aqueous secondary battery can be formed, for example, by applying the above-described composition for a functional layer onto the surface of a suitable substrate to form an applied film, and then drying the applied film that is formed. In other words, the presently disclosed functional layer for a non-aqueous secondary battery is composed of a dried product of the composition for a non-aqueous secondary battery functional layer set forth above, and normally contains the binder and the sulfonate group-containing inorganic particles. In the presently disclosed functional layer for a non-aqueous secondary battery, in a case in which the binder includes a crosslinkable monomer unit, the polymer including the crosslinkable monomer unit may be crosslinked in drying of the composition for a non-aqueous secondary battery functional layer, or may be crosslinked in heat treatment that is optionally performed after the drying (i.e., the functional layer for a non-aqueous secondary battery may contain a crosslinked product of the above-described polymer).

As a result of the presently disclosed functional layer for a non-aqueous secondary battery being formed using the composition for a non-aqueous secondary battery functional layer set forth above and containing the sulfonate group-containing inorganic particles set forth above, the presently disclosed functional layer for a non-aqueous secondary battery can capture metal ions such as transition metal ions, and can cause a secondary battery that includes the functional layer to display excellent low-temperature output characteristics and high-temperature cycle characteristics.

<Substrate>

No limitations are placed on the substrate on which the composition for a functional layer is applied. For example, an applied film of the composition for a functional layer may be formed on the surface of a detachable substrate, the applied film may be dried to form a functional layer, and then the detachable substrate may be peeled from the functional layer. The functional layer that is peeled from the detachable substrate in this manner can be used as a free-standing film in formation of a battery component of a secondary battery. Specifically, the functional layer that is peeled from the detachable substrate may be stacked on a separator substrate to form a separator including the functional layer or may be stacked on an electrode substrate to form an electrode including the functional layer.

However, it is preferable that a separator substrate or an electrode substrate is used as the substrate from a viewpoint of raising battery component production efficiency since a step of peeling the functional layer can be omitted. The functional layer provided on the separator substrate or electrode substrate can suitably be used as a protective layer for improving heat resistance, strength, and so forth of the separator or electrode.

[Separator Substrate]

The separator substrate is not specifically limited and may be a known separator substrate such as an organic separator substrate. The organic separator substrate is a porous member that is made from an organic material. The organic separator substrate may, for example, be a microporous membrane or non-woven fabric containing a polyolefin resin such as polyethylene or polypropylene, or an aromatic polyamide resin, and is preferably a microporous membrane or non-woven fabric made from polyethylene due to the excellent strength thereof.

[Electrode Substrate]

The electrode substrate (positive/negative electrode substrate) is not specifically limited and may, for example, be an electrode substrate obtained by forming an electrode mixed material layer on a current collector. The current collector, a binder for the electrode mixed material layer (binder for positive/negative electrode mixed material layer), and the method by which the electrode mixed material layer is formed on the current collector may be known examples thereof such as described, for example, in JP 2013-145763 A.

[Electrode Active Material]

An electrode active material in the electrode mixed material layer may be an organic or inorganic compound that enables reversible insertion and release of ions that contribute to the battery reactions upon application of a potential in an electrolyte.

An active material formed from an inorganic compound may be used as a positive electrode active material. For example, in the case of a lithium ion secondary battery, a transition metal-containing positive electrode active material such as a transition metal oxide, a composite oxide of lithium and a transition metal, or a transition metal sulfide may be used as a positive electrode active material formed from an inorganic compound. The transition metal is preferably a divalent or higher valence transition metal, and more preferably Co, Mn, Fe, or Ni.

The use of a positive electrode active material that contains a transition metal such as Co, Mn, Fe, or Ni as the positive electrode active material enables further increase of secondary battery capacity. Note that sulfonate groups have a property of preferentially capturing metal ions having a high valence among metals ions. Since Li ions that contribute to the battery reactions in a lithium ion secondary battery are monovalent ions and transition metal ions are divalent or higher valence ions, the sulfonate group-containing inorganic particles preferentially capture metal ions such as transition metal ions while tending not to impede movement in the secondary battery of ions that contribute to the battery reactions. Therefore, through use of the presently disclosed functional layer, it is possible to inhibit reduction of secondary battery electrical characteristics that may occur due to transition metal elution in a case in which a transition metal-containing positive electrode active material is used.

Specific examples of inorganic compounds that can be used for positive electrode active materials include lithium-containing composite metal oxides such as $LiCoO_2$, $LiNiO_2$, $LiMnO_2$, $LiMn_2O_4$, $LiNi_{1/3}Mn_{1/3}Co_{1/3}O_2$, $LiFePO_4$, and $LiFeVO_4$; transition metal sulfides such as $TiS_2$, $TiS_3$, and amorphous $MoS_2$; and transition metal oxides such as $Cu_2V_2O_3$, amorphous $V_2O$—$P_2O_5$, $MoO_3$, $V_2O_5$, and $V_6O_{13}$.

Of these inorganic compounds, $LiCoO_2$ or $LiNi_{1/3}Mn_{1/3}Co_{1/3}O_2$ is preferable, and $LiNi_{1/3}Mn_{1/3}Co_{1/3}O_2$ is more preferable as the positive electrode active material.

One of these positive electrode active materials may be used individually, or two or more of these positive electrode active materials may be used in combination. Moreover, a mixture of an inorganic compound such as described above and an organic compound such as a conductive polymer (for example, polyacetylene or poly-p-phenylene) may be used as the positive electrode active material.

Examples of negative electrode active materials that can be used include carbonaceous materials such as amorphous carbon, graphite, natural graphite, mesocarbon microbeads, and pitch-based carbon fiber; and conductive polymers such as polyacenes. Other examples include metals such as silicon, tin, zinc, manganese, iron, and nickel; alloys of these metals; oxides of these metals and alloys; and sulfate salts of these metals and alloys. Moreover, lithium metal; a lithium alloy such as Li—Al, Li—Bi—Cd, or Li—Sn—Cd; a lithium transition metal nitride; silicon; or the like may be used. One of these negative electrode active materials may be used individually, or two or more of these negative electrode active materials may be used in combination.

<Formation Method of Functional Layer for Non-Aqueous Secondary Battery>

Examples of methods by which the functional layer may be formed on a substrate such as the separator substrate or the electrode substrate set forth above include:

(1) a method in which the presently disclosed composition for a non-aqueous secondary battery functional layer is applied onto the surface of the separator substrate or electrode substrate (surface at the electrode mixed material layer side in the case of the electrode substrate; same applies below) and is then dried;

(2) a method in which the separator substrate or electrode substrate is immersed in the presently disclosed composition for a non-aqueous secondary battery functional layer and is then dried; and (3) a method in which the presently disclosed composition for a non-aqueous secondary battery functional layer is applied onto a detachable substrate and is dried to produce a functional layer that is then transferred onto the surface of the separator substrate or electrode substrate.

Of these methods, the method described in (1) is particularly preferable since it allows the thickness of the functional layer to be easily controlled. More specifically, the method described in (1) includes a step of applying the composition for a functional layer onto a substrate (application step) and a step of drying the composition for a functional layer that has been applied onto the substrate to form a functional layer (functional layer formation step).

[Application Step]

Examples of methods by which the composition for a functional layer can be applied onto the substrate in the application step include, but are not specifically limited to, doctor blading, reverse roll coating, direct roll coating, gravure coating, extrusion coating, and brush coating.

[Functional Layer Formation Step]

The composition for a functional layer on the substrate may be dried by any commonly known method in the functional layer formation step, without any specific limitations. For example, the drying method may be drying by warm, hot, or low-humidity air; drying in a vacuum, or drying by irradiation with infrared light, electron beams, or the like. Although no specific limitations are placed on the drying conditions, the drying temperature is preferably 50° C. to 150° C., and the drying time is preferably 3 minutes to 30 minutes.

(Battery Component Including Functional Layer)

A battery component (separator or electrode) including the presently disclosed functional layer may include elements other than the presently disclosed functional layer set forth above in addition to the separator substrate or electrode substrate and the presently disclosed functional layer so long as the effects disclosed herein are not significantly lost.

These elements other than the presently disclosed functional layer may be any elements that do not correspond to the presently disclosed functional layer, and one example thereof is an adhesive layer for adhering battery components to one another that may be provided on the presently disclosed functional layer.

(Non-Aqueous Secondary Battery)

The presently disclosed non-aqueous secondary battery includes the presently disclosed functional layer for a non-aqueous secondary battery set forth above. More specifically, the presently disclosed non-aqueous secondary battery includes a positive electrode, a negative electrode, a separator, and an electrolysis solution, and at least one battery component among the positive electrode, the negative electrode, and the separator includes the functional layer for a non-aqueous secondary battery set forth above. It is preferable that the presently disclosed functional layer for a non-aqueous secondary battery is included in the separator. This enables even more efficient capturing of metal ions originating from a positive electrode active material and can further improve electrical characteristics (for example, low-temperature output characteristics and high-temperature cycle characteristics) of the secondary battery including the separator. As a result of the presently disclosed non-aqueous secondary battery including a functional layer obtained from the presently disclosed composition for a non-aqueous secondary battery functional layer, the presently disclosed non-aqueous secondary battery can display excellent electrical characteristics (for example, low-temperature output characteristics and high-temperature cycle characteristics) even in a case in which a transition metal-containing positive electrode active material such as previously described is used.

<Positive Electrode, Negative Electrode, and Separator>

At least one of the positive electrode, the negative electrode, and the separator used in the presently disclosed secondary battery includes the presently disclosed functional layer. Specifically, an electrode produced by forming an electrode mixed material layer on a current collector to form an electrode substrate and then providing the presently disclosed functional layer on the electrode substrate may be used as a functional layer-containing positive electrode or a functional layer-containing negative electrode. Moreover, a separator produced by providing the presently disclosed functional layer on a separator substrate may be used as a functional layer-containing separator. The electrode substrate and the separator substrate can be any of the examples previously described in the "Functional layer for non-aqueous secondary battery" section.

Moreover, an electrode composed of an electrode substrate such as previously described or a separator composed of a separator substrate such as previously described may be used, without any specific limitations, as a positive electrode, negative electrode, or separator that does not include a functional layer.

<Electrolysis Solution>

The electrolysis solution is normally an organic electrolysis solution obtained by dissolving a supporting electrolyte in an organic solvent. The supporting electrolyte may, for example, be a lithium salt in the case of a lithium ion secondary battery. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)_2NLi$. Of these lithium salts, $LiPF_6$, $LiClO_4$, and $CF_3SO_3Li$ are preferable as they readily dissolve in solvents and exhibit a high degree of dissociation. Note that one electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolysis solution may be any organic solvent in which the supporting electrolyte dissolves. Examples of suitable organic solvents that can be used in the case of a lithium ion secondary battery include carbonates such as dimethyl carbonate (DMC), ethylene carbonate (EC), diethyl carbonate (DEC), propylene carbonate (PC), butylene carbonate (BC), methyl ethyl carbonate (MEC), and vinylene carbonate (VC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixed liquid of these solvents may be used. Of these solvents, carbonates are preferable due to having high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolysis solution may be adjusted as appropriate. Furthermore, known additives may be added to the electrolysis solution.

(Production Method of Non-Aqueous Secondary Battery)

The presently disclosed non-aqueous secondary battery set forth above can be produced by, for example, stacking the positive electrode and the negative electrode with the separator in-between, performing rolling, folding, or the like of the resultant stack as necessary to place the stack in a battery container, injecting the electrolysis solution into the battery container, and sealing the battery container. At least one component among the positive electrode, the negative electrode, and the separator is a functional layer-containing component. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

The following methods were used in the examples and comparative example to measure and evaluate the volume average particle diameter, BET specific surface area, and sulfonate group content of inorganic particles, the ion conductivity (percentage increase of Gurley value), water content, and transition metal ion capture amount of a functional layer, and the high-temperature cycle characteristics and low-temperature output characteristics of a secondary battery.

<Volume Average Particle Diameter of Inorganic Particles>

Inorganic particles produced in the examples and comparative example were added into a flow cell supplied with deionized water such that the scattering intensity was approximately 50% and were ultrasonically dispersed. Thereafter, a scattered light intensity distribution was measured using a laser diffraction particle size distribution analyzer (SALD-7100 produced by Shimadzu Corporation) and the volume-average particle diameter (D50) of the inorganic particles was determined from this distribution. Note that the volume average particle diameter was taken to be the particle diameter value at which an integrated value of a volume-basis particle size distribution was 50%.

<BET Specific Surface Area of Inorganic Particles>

The BET specific surface area of each type of inorganic particles in the examples and comparative example was measured by measuring the surface area of the inorganic particles using a flow-type specific surface area measuring device (FlowSorb III 2305 produced by Shimadzu Corporation) and dividing the obtained surface area by the weight of the inorganic particles that were used.

<Method of Determining Presence of Sulfonate Groups in Inorganic Particles>

The presence or absence of sulfonate groups in inorganic particles used in the examples and comparative example was determined by using an X-ray photoelectron spectroscopy analyzer (PHI-5000 VersaProbe-II produced by Ulvac-Phi, Incorporated) to measure the energy of photoelectrons generated under conditions of X-ray irradiation with a power of 25 W and a beam diameter of 100 μm, and then determining the presence or absence of a peak at 160 eV to 170 eV corresponding to the binding energy of a sulfonate group.

Moreover, the presence or absence of peaks corresponding to acid groups other than sulfonate groups was determined from a profile of binding energy on a horizontal axis and number of photoelectrons on a vertical axis that was obtained using the X-ray photoelectron spectroscopy analyzer. The ratio of sulfonate groups relative to all acid groups included in the inorganic particles was calculated based on the results determined as described above.

<Method of Measuring Sulfonate Group Content in Inorganic Particles>

The sulfonate group content in inorganic particles used in the examples and comparative example was measured by adding 1N hydrochloric acid aqueous solution to the inorganic particles and performing mixing to convert counter-ions of the sulfonate groups to hydrogen ions, subsequently performing treatment in 0.5N sodium chloride aqueous solution to remove hydrogen ions from the sulfonate groups, and then using a neutralization titration device (COMTITE-900 produced by Hiranuma Sangyo Co., Ltd.) to quantify the free hydrogen ions. The determined amount (molar amount) of hydrogen ions was multiplied by the ratio of sulfonate groups relative to all acid groups included in the inorganic particles, which was obtained as previously described, to calculate the amount of hydrogen ions originating from sulfonate groups. Moreover, the amount of hydrogen ions originating from sulfonate groups was divided by the mass of inorganic particles that was used to determine the sulfonate group content (μmol/g) in the inorganic particles.

<Ion Conductivity of Functional Layer (Percentage Increase of Gurley Value)>

A digital Oken type Air-Permeability and Smoothness Tester (EYO-5-1M-R produced by Asahi Seiko Co., Ltd.) was used to measure the Gurley value (s/100 cc) of a separator including a functional layer for a non-aqueous secondary battery and the Gurley value (s/100 cc) of a separator substrate prior to formation of the functional layer. Specifically, the percentage increase of the Gurley value ΔG (=(G1/G0)×100(%)) was determined from the Gurley value G0 of the "separator substrate" prior to formation of the functional layer and the Gurley value G1 of the "functional layer-containing separator" after formation of the functional layer, and was evaluated by the following criteria. A smaller percentage increase of the Gurley value ΔG indicates that the functional layer for a non-aqueous secondary battery has better ion conductivity.

A: ΔG of less than 130%
B: ΔG of at least 130% and less than 200%
C: ΔG of 200% or more <Water Content of Functional>

A separator substrate onto which a composition for a functional layer had been applied was cut out to a size of 10 cm in width by 10 cm in length to obtain a specimen. The specimen was vacuum dried for 10 hours at 60° C. using a vacuum dryer installed in an environment having a temperature of 25° C. and a dew point of −60° C. Thereafter, the water content of the specimen was measured by the Karl Fischer method (JIS K-0068 (2001); water vaporization method; vaporization temperature: 150° C.) using a coulometric titration water meter. The water content was evaluated according to the following criteria.

A: Water content of less than 300 ppm

B: Water content of at least 300 ppm and less than 400 ppm

C: Water content of 400 ppm or more

<Transition Metal Ion Capture Amount of Functional Layer>

In measurement of the transition metal capture amount of a functional layer for a non-aqueous secondary battery produced in each of the examples and the comparative example, a separator obtained by applying a composition for a non-aqueous secondary battery functional layer to form the functional layer was first punched to a size of 100 cm$^2$ in area to obtain a specimen, and then the mass (A) of the specimen prior to transition metal ion capture was measured. Next, a separator substrate onto which the composition for a non-aqueous secondary battery functional layer had not been applied was punched to a size of 100 cm$^2$ in area and the mass (B) of the punched separator substrate was measured. The mass of the functional layer prior to transition metal ion capture was determined by subtracting the mass (B) from the mass (A).

Next, an electrolysis solution was obtained by dissolving LiPF$_6$ as a supporting electrolyte in a solvent (ethyl methyl carbonate/ethylene carbonate=70:30 (mass ratio)) in a concentration of 1 mol/L. Cobalt chloride (anhydrous) (CoCl$_2$), nickel chloride (anhydrous) (NiCl$_2$), and manganese chloride (anhydrous) (MnCl$_2$) were dissolved in this electrolysis solution as transition metal ion sources such that the concentration of each metal ion was 20 mass ppm to prepare an electrolysis solution in which transition metal ions were present in specific proportions in the same way as in a non-aqueous secondary battery. Next, the above-described specimen was placed in a glass vessel, 15 g of the electrolysis solution in which cobalt chloride, manganese chloride, and nickel chloride were dissolved as described above was added into the glass vessel, and the specimen was left for 5 days at 25° C. in an immersed state. Thereafter, the specimen was taken out of the glass vessel, was sufficiently washed with diethyl carbonate, and diethyl carbonate attached to the surface of the specimen was sufficiently wiped off. The specimen was then placed in a Teflon® (Teflon is a registered trademark in Japan, other countries, or both) beaker, and sulfuric acid and nitric acid (sulfuric acid:nitric acid=0.1:2 (volume ratio)) were added thereto. The beaker was heated on a hot plate until carbonization of the specimen occurred. Further nitric acid and perchloric acid (nitric acid:perchloric acid=2:0.2 (volume ratio)) were added, followed by perchloric acid and hydrofluoric acid (perchloric acid:hydrofluoric acid=2:0.2 (volume ratio)), and heating was performed until white smoke was given off. Next, 20 mL of nitric acid and ultrapure water (nitric acid:ultrapure water=0.5:10 (volume ratio)) was added to the beaker and heating was performed. The beaker was cooled, and then ultrapure water was added to reach a total volume of 100 mL and obtain a transition metal ion solution that contained transition metal ions. The amounts of cobalt, nickel, and manganese in the obtained transition metal ion solution were measured using an ICP mass spectrometer (ELAN DRS II produced by PerkinElmer, Inc.). The total amount of cobalt, nickel, and manganese in the transition metal ion solution was divided by the mass of the functional layer prior to transition metal ion capture to calculate the amount of transition metal (mass ppm) in the specimen, and this calculated value was taken to be the transition metal ion capture amount of the functional layer for a non-aqueous secondary battery. A larger transition metal ion capture amount indicates higher transition metal ion capturing ability per unit mass of the functional layer for a non-aqueous secondary battery.

A: Transition metal ion capture amount of 2,500 ppm or more

B: Transition metal ion capture amount of at least 1,000 ppm and less than 2,500 ppm C: Transition metal ion capture amount of less than 1,000 ppm <High-Temperature Cycle Characteristics of Secondary Battery>

A wound laminate cell having a discharge capacity of 800 mAh was subjected to 200 charge/discharge cycles of charging to 4.35 V and discharging to 3 V by a 0.5C constant-current method at an ambient temperature of 45° C., and the discharge capacity was measured. Note that an average value for 5 cells was taken to be the measured value. The charge/discharge capacity retention rate was determined by calculating the discharge capacity at completion of 200 cycles as a percentage relative to the discharge capacity at completion of 3 cycles. The charge/discharge capacity retention rate was evaluated by the following criteria. A higher value indicates better secondary battery high-temperature cycle characteristics.

A: Charge/discharge capacity retention rate of 80% or more

B: Charge/discharge capacity retention rate of at least 70% and less than 80%

C: Charge/discharge capacity retention rate of at least 60% and less than 70%

D: Charge/discharge capacity retention rate of less than 60%

<Low-Temperature Output Characteristics of Secondary Battery>

A wound lithium ion secondary battery having a discharge capacity of 800 mAh was left at an ambient temperature of 25° C. for 24 hours and was then charged for 5 hours at a charge rate of 0.1C and an ambient temperature of 25° C. The voltage V0 at this time was measured. Thereafter, the lithium ion secondary battery was discharged at a discharge rate of 1C and an ambient temperature of −10° C., and the voltage V1 at 15 s after the start of discharge was measured. The voltage change ΔV (=V0−V1) was determined and was evaluated by the following criteria. A smaller value for the voltage change ΔV indicates better secondary battery low-temperature output characteristics.

A: Voltage change ΔV of less than 350 mV

B: Voltage change ΔV of at least 350 mV and less than 500 mV

C: Voltage change ΔV of 500 mV or more

Example 1

<Sulfonate Group Modification of Inorganic Particles>

Sulfonate group-containing inorganic particles were produced as follows. First, 3 g of 3-glycidoxypropylmethyldimethoxysilane as a silane coupling agent and 100 g of alumina (product name: LS-250; produced by Nippon Light Metal Co., Ltd.; specific surface area: 5.9 m$^2$/g; volume average particle diameter: 0.7 μm) as raw material inorganic particles were mixed using a juicer mixer, and were heat-treated for 1 hour at 250° C. in an autoclave that had been purged with nitrogen gas. Thereafter, unreacted silane compound was removed by pressure reduction with the mixture still under heating. Next, the resultant silane-treated alumina was dispersed in 100 mL of ethanol, and then 200 mL of an aqueous solution of 20 g of sodium sulfite as a sulfite was added. Mixing was performed for 2 days at 90° C. to obtain alumina including sulfonate salt groups. Next, the alumina was filtered, washed, and dried to obtain sulfonate group-containing inorganic particles. The presence of sulfonate groups in the sulfonate group-containing inorganic particles was determined by confirming the presence of a peak at a binding energy of 168 eV by X-ray photoelectron spectroscopy. It was also determined by X-ray photoelectron spectroscopy that the sulfonate group-containing inorganic particles did not include acid groups other than sulfonate groups in a significant amount. Therefore, the ratio of sulfonate groups relative to all acid groups included in the inorganic particles was 1.

The volume average particle diameter, BET specific surface area, and sulfonate group content of the sulfonate group-containing inorganic particles were measured and are shown in Table 1.

<Production of Binder>

A flask equipped with a stirrer was charged with 90 parts by mass of deionized water and 0.7 parts by mass of sodium dodecyl diphenyl ether sulfonate as an emulsifier. The contents of the flask were sufficiently stirred and were then maintained at 70° C. Next, 77.3 parts by mass of 2-ethylhexyl acrylate (2-EHA) as a (meth)acrylic acid ester monomer, 20 parts by mass of acrylonitrile (AN) as a (meth) acrylonitrile monomer, 2 parts by mass of methacrylic acid (MAA) as a carboxylic acid group-containing monomer, 0.5 parts by mass of 2-acrylamido-2-methylpropane sulfonic acid (AMPS) as a sulfonate group-containing monomer, 0.2 parts of allyl methacrylate (AMA) as a crosslinkable monomer, 0.3 parts of potassium persulfate as a polymerization initiator, and 1.6 parts of sodium lauryl sulfate as an emulsifier were added, and sufficient stirring was performed. Thereafter, polymerization was performed by maintaining the temperature at 70° C. for 3 hours and then heating to 80° C. for 2 hours to obtain a water dispersion of a binder. The polymerization conversion rate was calculated to be 96% from the solid content concentration.

<Production of Composition for Functional Layer>

Water was added to 93 parts by mass of the sulfonate group-containing inorganic particles and 1 part by mass of a polycarboxylic acid ammonium salt as a dispersant to adjust the solid content concentration to 50 mass %, and then the inorganic particles were dispersed using a media-less disperser (LMZ-015 produced by Ashizawa Finetech Ltd.) in which beads of 0.4 mm in diameter were used with a circumferential speed of 6 m/s and a flow rate of 0.3 L/minute. Thereafter, 2 parts by mass in terms of solid content of a polyacrylamide aqueous solution (Polystron 117 produced by Arakawa Chemical Industries, Ltd.) having a solid content concentration of 15 mass % was added and mixed. Next, 4 parts by mass in terms of solid content of the above-described binder was added, and water was added to adjust the solid content concentration to 40 mass % and yield a composition for a functional layer in the form of a slurry. The viscosity of the produced composition for a functional layer at 60 rpm was 24.90 mPa·s as measured using a B-type viscometer (TVB-10M produced by Toki Sangyo Co., Ltd.) after adjustment to 25° C.

(Production of Separator for Secondary Battery)

An organic separator substrate (made from polyethylene; thickness: 12 μm; Gurley value: 150 s/100 cc) formed from a porous substrate made from polyethylene was prepared. The composition for a functional layer described above was applied onto one side of the prepared organic separator substrate and was dried for 3 minutes at 50° C. As a result, an organic separator including a functional layer of 3 μm in thickness at one side was obtained.

<Production of Negative Electrode>

A 5 MPa pressure vessel equipped with a stirrer was charged with 33.5 parts of 1,3-butadiene, 3.5 parts of itaconic acid, 62 parts of styrene, 1 part of 2-hydroxyethyl acrylate, 0.4 parts of sodium dodecylbenzenesulfonate as an emulsifier, 150 parts of deionized water, and 0.5 parts of potassium persulfate as a polymerization initiator. The contents of the pressure vessel were sufficiently stirred and were than heated to 50° C. to initiate polymerization. The reaction was terminated by cooling at the point at which the polymerization conversion rate reached 96% to yield a mixture containing a binder (SBR). The mixture containing the binder (SBR) was adjusted to pH 8 through addition of 5% sodium hydroxide aqueous solution and then unreacted monomers were removed by distillation under heating and reduced pressure. Thereafter, the mixture was cooled to 30° C. or lower to obtain a water dispersion containing the target binder (SBR).

Next, deionized water was added to 100 parts of artificial graphite (volume average particle diameter: 15.6 μm) as a negative electrode active material and 1 part in terms of solid content of a 2% aqueous solution of a sodium salt of carboxymethyl cellulose (MAC350HC produced by Nippon Paper Industries Co., Ltd.) as a thickener to adjust the solid content concentration to 68%, and then mixing was performed for 60 minutes at 25° C. Further deionized water was used to adjust the solid content concentration to 62% and then mixing was performed for 15 minutes at 25° C. to yield a mixed liquid. Thereafter, 1.5 parts by mass in terms of solid content of the above-described binder (SBR) was added to the resultant mixed liquid, deionized water was used to adjust the final solid content concentration to 52%, and further mixing was performed for 10 minutes. The resultant mixed liquid was subjected to a defoaming process under reduced pressure to yield a slurry composition for a secondary battery negative electrode having good fluidity.

The obtained slurry composition for a negative electrode was applied onto copper foil (current collector) of 20 μm in thickness using a comma coater such as to have a thickness of approximately 150 μm after drying. The applied slurry composition for a negative electrode was dried by conveying the copper foil inside a 60° C. oven at a speed of 0.5 m/minute over a period of 2 minutes. Thereafter, heat treatment was performed for 2 minutes at 120° C. to obtain a pre-pressing negative electrode web. The pre-pressing negative electrode web was rolled by roll pressing to obtain a post-pressing negative electrode including a negative electrode mixed material layer of 80 μm in thickness.

<Positive Electrode>

A mixed liquid was obtained by adding NMP to 100 parts of $LiNi_{1/3}Mn_{1/3}Co_{1/3}O_2$ (NMC) having a volume average particle diameter of 12 μm as a positive electrode active material, 2 parts of acetylene black (HS-100 produced by Denki Kagaku Kogyo Kabushiki Kaisha) as a conductive material, and 2 parts in terms of solid content of PVDF (#7208 produced by Kureha Corporation) as a binder for a positive electrode such that the total solid content concentration was 70%. The resultant mixed liquid was mixed using a planetary mixer to yield a slurry composition for a secondary battery positive electrode.

The obtained slurry composition for a positive electrode was applied onto aluminum foil (current collector) of 20 μm in thickness using a comma coater such as to have a thickness of approximately 150 μm after drying. The applied slurry composition for a positive electrode was dried by conveying the aluminum foil inside a 60° C. oven at a speed of 0.5 m/minute over a period of 2 minutes. Thereafter, heat treatment was performed for 2 minutes at 120° C. to obtain a pre-pressing positive electrode web. The pre-pressing positive electrode web was rolled by roll pressing to obtain a post-pressing positive electrode including a positive electrode mixed material layer of 80 μm in thickness.

<Secondary Battery>

The obtained post-pressing positive electrode was cut out to 49 cm×5 cm in size and was placed with the surface at the positive electrode mixed material layer side of the positive electrode on top. A functional layer-equipped separator that had been cut out to 55 cm×5.5 cm in size was placed on the positive electrode such that the positive electrode mixed material layer and the functional layer faced one another. Moreover, the obtained post-pressing negative electrode was cut out as a 50 cm×5.2 cm rectangle and was placed on the separator such that the surface at the negative electrode mixed material layer side of the negative electrode faced toward the separator. The resultant stack was wound up into a roll by a winding machine. The roll was pressed at 60° C. and 0.5 MPa to obtain a flat product that was then enclosed in an aluminum packing case used as a battery case. An electrolysis solution (solvent: EC/DEC/VC=68.5/30/1.5 (volume ratio); electrolyte: LiPF$_6$ of 1 M in concentration) was injected into the aluminum packing case such that no air remained. The aluminum packing case was subsequently closed by heat sealing at 150° C. to seal an opening of the aluminum packing case and thereby produce a wound lithium ion secondary battery having a discharge capacity of 800 mAh.

The high-temperature cycle characteristics and low-temperature output characteristics of the secondary battery were evaluated. The results are shown in Table 1.

Example 2

Inorganic particles, a binder, a composition for a functional layer, a separator, a negative electrode, a positive electrode, and a secondary battery were produced in the same way as in Example 1 with the exception that the amount of sodium sulfite added in sulfonate group modification of the inorganic particles was set as 2 g. Each evaluation was performed in the same way as in Example 1. The results are shown in Table 1.

The presence of sulfonate groups in the resultant sulfonate group-containing inorganic particles was determined by confirming the presence of a peak at a binding energy of 168 eV by X-ray photoelectron spectroscopy analysis. It was also determined by X-ray photoelectron spectroscopy analysis that the sulfonate group-containing inorganic particles did not include acid groups other than sulfonate groups in a significant amount. Therefore, the ratio of sulfonate groups relative to all acid groups included in the inorganic particles was 1.

Example 3

Inorganic particles, a binder, a composition for a functional layer, a separator, a negative electrode, a positive electrode, and a secondary battery were produced in the same way as in Example 1 with the exception that the amount of sodium sulfite added in sulfonate group modification of the inorganic particles was set as 150 g. Each evaluation was performed in the same way as in Example 1. The results are shown in Table 1.

The presence of sulfonate groups in the resultant sulfonate group-containing inorganic particles was determined by confirming the presence of a peak at a binding energy of 168 eV by X-ray photoelectron spectroscopy analysis. It was also determined by X-ray photoelectron spectroscopy analysis that the sulfonate group-containing inorganic particles did not include acid groups other than sulfonate groups in a significant amount. Therefore, the ratio of sulfonate groups relative to all acid groups included in the inorganic particles was 1.

Example 4

Inorganic particles, a binder, a composition for a functional layer, a separator, a negative electrode, a positive electrode, and a secondary battery were produced in the same way as in Example 1 with the exception that the amount of sodium sulfite added in sulfonate group modification of the inorganic particles was set as 780 g. Each evaluation was performed in the same way as in Example 1. The results are shown in Table 1.

The presence of sulfonate groups in the resultant sulfonate group-containing inorganic particles was determined by confirming the presence of a peak at a binding energy of 168 eV by X-ray photoelectron spectroscopy analysis. It was also determined by X-ray photoelectron spectroscopy analysis that the sulfonate group-containing inorganic particles did not include acid groups other than sulfonate groups in a significant amount. Therefore, the ratio of sulfonate groups relative to all acid groups included in the inorganic particles was 1.

Example 5

Inorganic particles, a binder, a composition for a functional layer, a separator, a negative electrode, a positive electrode, and a secondary battery were produced in the same way as in Example 1 with the exception that the amounts of components in production of the composition for a functional layer were set as 83 parts by mass of the sulfonate group-containing inorganic particles, 10 parts by mass in terms of solid content of the binder, 3 parts by mass of a polycarboxylic acid ammonium salt as a dispersant, and 4 parts by mass in terms of solid content of a polyacrylamide aqueous solution (Polystron 117 produced by Arakawa Chemical Industries, Ltd.) having a solid content concentration of 15 mass % as a viscosity modifier. Each evaluation was performed in the same way as in Example 1. The results are shown in Table 1.

Example 6

Inorganic particles, a binder, a composition for a functional layer, a separator, a negative electrode, a positive electrode, and a secondary battery were produced in the same way as in Example 1 with the exception that a sulfonate group-containing monomer was not used in production of the binder, and the composition of the binder was changed to a composition that did not include a sulfonate group-containing monomer unit as shown in Table 1. Each evaluation was performed in the same way as in Example 1. The results are shown in Table 1.

Example 7

Inorganic particles, a binder, a composition for a functional layer, a separator, a negative electrode, a positive electrode, and a secondary battery were produced in the same way as in Example 1 with the exception that the proportions of monomers used in production of the binder were changed, and the composition of the binder was changed to a composition shown in Table 1 such that the percentage content of the sulfonate group-containing monomer unit was 8 mass %. Each evaluation was performed in the same way as in Example 1. The results are shown in Table 1.

Example 8

Inorganic particles, a binder, a composition for a functional layer, a separator, a negative electrode, a positive electrode, and a secondary battery were produced in the same way as in Example 1 with the exception that alumina having a specific surface area of 9.1 $m^2/g$ and a volume average particle diameter of 0.7 μm (MM-22 produced by Nippon Light Metal Co., Ltd.) was used as the raw material inorganic particles. Each evaluation was performed in the same way as in Example 1. The results are shown in Table 1.

The presence of sulfonate groups in the resultant sulfonate group-containing inorganic particles was determined by confirming the presence of a peak at a binding energy of 167 eV by X-ray photoelectron spectroscopy analysis. It was also determined by X-ray photoelectron spectroscopy analysis that the sulfonate group-containing inorganic particles did not include acid groups other than sulfonate groups in a significant amount. Therefore, the ratio of sulfonate groups relative to all acid groups included in the inorganic particles was 1.

Example 9

Inorganic particles, a binder, a composition for a functional layer, a separator, a negative electrode, a positive electrode, and a secondary battery were produced in the same way as in Example 1 with the exception that barium sulfate (specific surface area: 5.9 $m^2/g$; volume average particle diameter: 0.6 μm) was used as the raw material inorganic particles. Each evaluation was performed in the same way as in Example 1. The results are shown in Table 1.

The presence of sulfonate groups in the resultant sulfonate group-containing inorganic particles was determined by confirming the presence of a peak at a binding energy of 167 eV by X-ray photoelectron spectroscopy analysis. It was also determined by X-ray photoelectron spectroscopy analysis that the sulfonate group-containing inorganic particles did not include acid groups other than sulfonate groups in a significant amount. Therefore, the ratio of sulfonate groups relative to all acid groups included in the inorganic particles was 1.

Comparative Example 1

Inorganic particles, a binder, a composition for a functional layer, a separator, a negative electrode, a positive electrode, and a secondary battery were produced in the same way as in Example 1 with the exception that the raw material inorganic particles were used unchanged as the inorganic particles without sulfonate group modification. Each evaluation was performed in the same way as in Example 1. The results are shown in Table 1.

The absence of sulfonate groups in the inorganic particles was determined by confirming that a peak was not present in a binding energy range of 160 eV to 170 eV by X-ray photoelectron spectroscopy analysis.

In the following table:
"2-EHA" indicates 2-ethylhexyl acrylate;
"AN" indicates acrylonitrile;
"MAA" indicates methacrylic acid;
"AMPS" indicates 2-acrylamido-2-methylpropane sulfonic acid; and
"AMA" indicates allyl methacrylate.

| | | | | Example 1 | Example 2 | Example 3 | Example 4 | Example 5 |
|---|---|---|---|---|---|---|---|---|
| Inorganic particles | | Type | | Alumina | Alumina | Alumina | Alumina | Alumina |
| | | Specific surface area [$m^2/g$] | | 5.7 | 5.8 | 5.6 | 5.4 | 5.7 |
| | | Volume average particle diameter [μm] | | 0.6 | 0.6 | 0.6 | 0.6 | 0.6 |
| | | Sulfonate group content [μmol/g] | | 30 | 0.15 | 230 | 1200 | 30 |
| | | Amount [mass %] | | 93 | 93 | 93 | 93 | 83 |
| Binder | Composition | Acrylic acid ester monomer unit | Type | 2-EHA | 2-EHA | 2-EHA | 2-EHA | 2-EHA |
| | | | Percentage content | 77.3 | 77.3 | 77.3 | 77.3 | 77.3 |
| | | (Meth)acrylonitrile monomer unit | Type | AN | AN | AN | AN | AN |
| | | | Percentage content | 20 | 20 | 20 | 20 | 20 |
| | | Carboxylic acid group-containing monomer unit | Type | MAA | MAA | MAA | MAA | MAA |
| | | | Percentage content | 2 | 2 | 2 | 2 | 2 |
| | | Sulfonate group-containing monomer unit | Type | AMPS | AMPS | AMPS | AMPS | AMPS |
| | | | Percentage content | 0.5 | 0.5 | 0.5 | 0.5 | 0.5 |
| | | Crosslinkable monomer unit | Type | AMA | AMA | AMA | AMA | AMA |
| | | | Percentage content | 0.2 | 0.2 | 0.2 | 0.2 | 0.2 |
| | | Amount [mass %] | | 4 | 4 | 4 | 4 | 10 |
| | | Positive electrode active material | | NMC | NMC | NMC | NMC | NMC |
| Evaluation | Functional layer | Ion conductivity (percentage increase of Gurley) | | A | B | A | A | B |
| | | Transition metal capture amount | | A | B | A | A | B |
| | | Water content | | A | A | B | C | B |
| | Secondary battery | High-temperature cycle characteristics | | A | B | B | C | B |
| | | Low-temperature output characteristics | | A | B | A | A | B |

| | | | | Example 6 | Example 7 | Example 8 | Example 9 | Comparative Example 1 |
|---|---|---|---|---|---|---|---|---|
| Inorganic particles | | Type | | Alumina | Alumina | Alumina | Barium sulfate | Alumina |
| | | Specific surface area [$m^2/g$] | | 5.7 | 5.7 | 8.5 | 5.4 | 5.9 |
| | | Volume average particle diameter [μm] | | 0.6 | 0.6 | 0.8 | 0.6 | 0.7 |

-continued

| | | | | | | | | |
|---|---|---|---|---|---|---|---|---|
| Binder | | Sulfonate group content [μmol/g] | | 30 | 30 | 30 | 40 | 0 |
| | | Amount [mass %] | | 93 | 93 | 93 | 93 | 93 |
| | Composition | Acrylic acid ester monomer unit | Type | 2-EHA | 2-EHA | 2-EHA | 2-EHA | 2-EHA |
| | | | Percentage content | 77.8 | 69.8 | 77.3 | 77.3 | 77.8 |
| | | (Meth)acrylonitrile monomer unit | Type | AN | AN | AN | AN | AN |
| | | | Percentage content | 20 | 20 | 20 | 20 | 20 |
| | | Carboxylic acid group-containing monomer unit | Type | MAA | MAA | MAA | MAA | MAA |
| | | | Percentage content | 2 | 2 | 2 | 2 | 2 |
| | | Sulfonate group-containing monomer unit | Type | — | AMPS | AMPS | AMPS | — |
| | | | Percentage content | — | 8 | 0.5 | 0.5 | — |
| | | Crosslinkable monomer unit | Type | AMA | AMA | AMA | AMA | AMA |
| | | | Percentage content | 0.2 | 0.2 | 0.2 | 0.2 | 0.2 |
| | | Amount [mass %] | | 4 | 4 | 4 | 4 | 4 |
| | | Positive electrode active material | | NMC | NMC | NMC | NMC | NMC |
| Evaluation | Functional layer | Ion conductivity (percentage increase of Gurley) | | B | A | A | A | C |
| | | Transition metal capture amount | | B | A | A | A | C |
| | | Water content | | A | B | B | A | A |
| | Secondary battery | High-temperature cycle characteristics | | A | B | B | A | D |
| | | Low-temperature output characteristics | | B | A | A | A | C |

As can be seen from Table 1, in Examples 1 to 9 in which sulfonate group-containing inorganic particles were used, it was possible to form a functional layer that enabled a secondary battery to display a balance of high levels of both high-temperature cycle characteristics and low-temperature output characteristics. Moreover, it can be seen that secondary battery high-temperature cycle characteristics and low-temperature output characteristics both decreased in Comparative Example 1 in which the inorganic particles did not include a sulfonate group.

INDUSTRIAL APPLICABILITY

According to this disclosure, it is possible to provide a composition for a non-aqueous secondary battery functional layer that can improve secondary battery electrical characteristics.

Moreover, according to this disclosure, it is possible to provide a functional layer for a non-aqueous secondary battery that can improve secondary battery electrical characteristics.

Furthermore, according to this disclosure, it is possible to provide a non-aqueous secondary battery having excellent electrical characteristics such as low-temperature output characteristics and high-temperature cycle characteristics.

The invention claimed is:

1. A composition for a non-aqueous secondary battery functional layer comprising:
   a binder; and
   inorganic particles including a sulfonate group,
   wherein the inorganic particles have a percentage content of 80 mass % or more relative to total solid content.

2. The composition for a non-aqueous secondary battery functional layer according to claim 1, wherein
   the inorganic particles have a sulfonate group content of at least 0.1 μmol/g and not more than 1,200 μmol/g.

3. The composition for a non-aqueous secondary battery functional layer according to claim 1, wherein
   the binder includes a sulfonate group.

4. A functional layer for a non-aqueous secondary battery formed using the composition for a non-aqueous secondary battery functional layer according to claim 1.

5. A non-aqueous secondary battery comprising the functional layer for a non-aqueous secondary battery according to claim 4.

6. The non-aqueous secondary battery according to claim 5, comprising a positive electrode, a negative electrode, an electrolysis solution, and a separator, wherein
   the separator includes the functional layer for a non-aqueous secondary battery.

7. The non-aqueous secondary battery according to claim 5, wherein
   the positive electrode contains a positive electrode active material including one or more of Co, Mn, Fe, and Ni.

* * * * *